United States Patent [19]

Yoshida

[11] Patent Number: 4,974,007
[45] Date of Patent: Nov. 27, 1990

[54] PHOTOGRAPHING DEVICE HAVING PLURAL RANGE FINDING ELEMENTS AND PLURAL PHOTOMETRIC ELEMENTS

[75] Inventor: Masaaki Yoshida, Tokyo, Japan

[73] Assignee: Canon Kabushiki Kaisha, Tokyo, Japan

[21] Appl. No.: 350,647

[22] Filed: May 11, 1989

[30] Foreign Application Priority Data

May 20, 1988 [JP] Japan ................. 63-123317

[51] Int. Cl.⁵ ............................................ G03B 13/00
[52] U.S. Cl. ................................ 354/402; 354/429; 354/432
[58] Field of Search .................... 354/400–409, 354/429, 431, 432, 416, 417

[56] References Cited

U.S. PATENT DOCUMENTS

| | | | |
|---|---|---|---|
| 4,423,936 | 1/1984 | Johnson | 354/432 |
| 4,429,966 | 2/1984 | Hosoe et al. | 354/406 |
| 4,456,352 | 6/1984 | Sato | 354/429 |
| 4,488,799 | 12/1984 | Suzuki et al. | 354/406 |
| 4,643,557 | 2/1987 | Ishizaki et al. | 354/406 |
| 4,705,382 | 11/1987 | Mukai et al. | 354/432 |
| 4,760,418 | 7/1988 | Ishizaki et al. | 354/403 |
| 4,768,052 | 8/1988 | Hamada et al. | 354/406 |

Primary Examiner—L. T. Hix
Assistant Examiner—David M. Gray
Attorney, Agent, or Firm—Fitzpatrick, Cella, Harper & Scinto

[57] ABSTRACT

A photographing device has a range sensor including a plurality of range sensing elements, and a photometric sensor including a plurality of photometric elements. The positions of the photometric elements on the photometric sensor correspond to the positions of the range finding elements on the range sensor. Further, the area of each photometric element is larger than the area of the corresponding range finding element. Thus, proper exposure control may be affected for a selected range finding element.

17 Claims, 4 Drawing Sheets

RANGE SENSOR

PHOTOMETRIC SENSOR

PHOTOGRAPHING DEVICE HAVING PLURAL RANGE FINDING ELEMENTS AND PLURAL PHOTOMETRIC ELEMENTS

BACKGROUND OF THE INVENTION

1. Field of the Invention

The present invention relates to a photographing device having a multiply-partitioned range sensor and a multiply-partitioned photometric sensor.

2. Background of the Invention

A photographing device (nonlimitingly referred to as a "camera") having a multiply - partitioned range finder has the advantage of enabling focusing with different weights applied to a main subject and secondary subjects. The assignee of this application has made various propositions for such a camera. Further, cameras having a multiply-partitioned photometric sensor have been investigated. For example, the nearest subject may be regarded as the main subject, and control of the exposure and/or operation of the strobe light is carried out accordingly (see Japanese laid-open Patent No. 90633/1987).

However, when a photograph is taken with a camera incorporating the above features and using a strobe light, even if the focus is properly adjusted to the main subject, it does not necessarily mean that proper control of the strobe light can be obtained for subsequent photographs, and thus there is a possibility that a photograph may be taken at an improper exposure level.

SUMMARY OF THE INVENTION

An Object of the Invention is to provide a photographing device that can take a natural-light or strobe photograph at an exposure level appropriate to the main object at all times.

To achieve the above object, the present invention provides a photographing device having a range sensor including a plurality of range finding elements. A photometric sensor is also provided and includes a plurality of photometric elements. The photometric area of each photometric element covers a corresponding range finding area of a corresponding range finding element. Therefore, the range finding position within a photograph scene corresponds to the proper photometric position, even when the photograph scene changes.

BRIEF DESCRIPTION OF THE DRAWINGS

The structure, functions, and advantages of the present invention will become apparent from the following detailed description of the preferred embodiment and the appended drawings in which.

DETAILED DESCRIPTION OF THE PREFERRED EMBODIMENT

Figure 2:
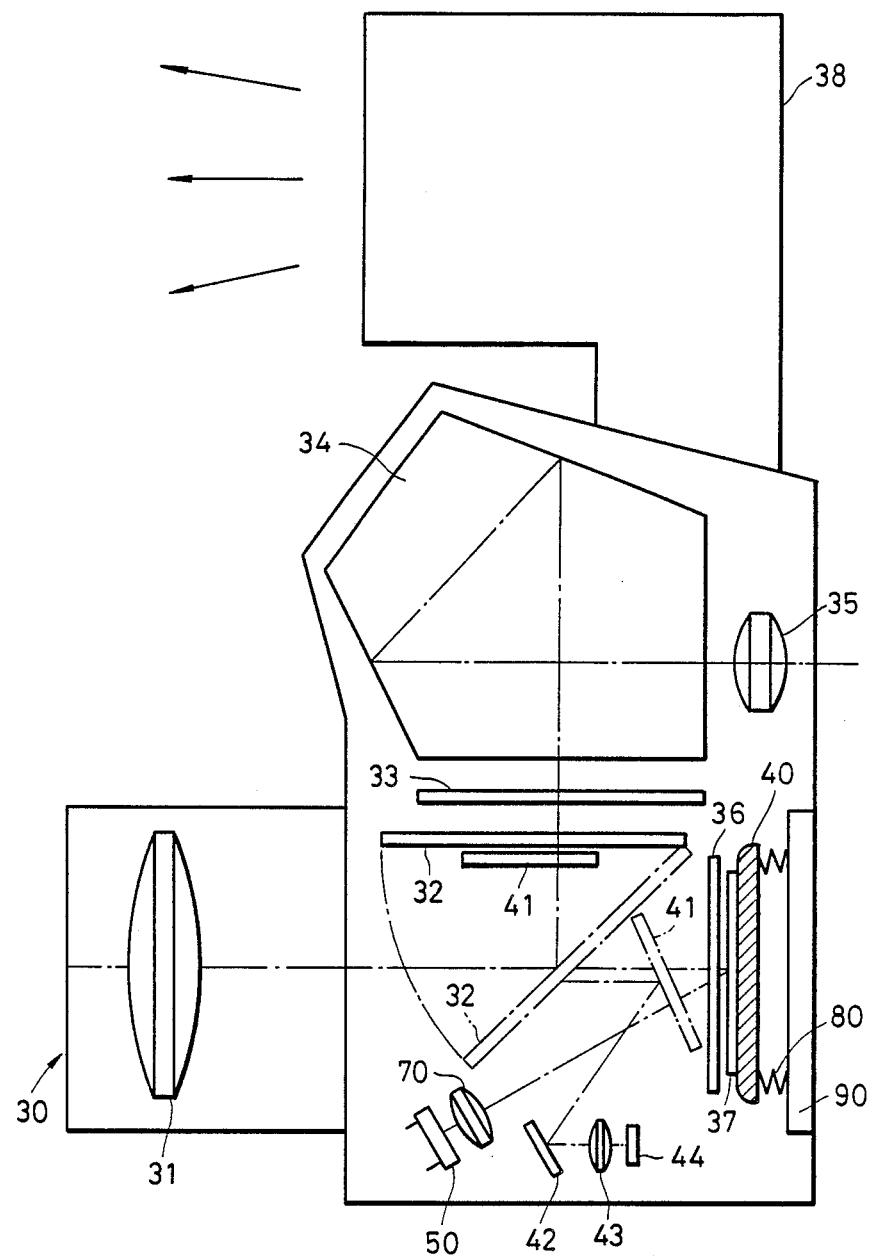
FIG. 2 is a schematic side view of a camera incorporating the preferred embodiment.

FIG. 2 is a schematic drawing showing a photometric device incorporating the film-surface reflection light adjusting system according to the preferred embodiment. At the time of photography, a path of light from an object passes through an objective lens 31 of a single lens reflex camera 30, is bent 90 degrees by a movable reflector 32, and its image is formed on a focusing plate 33. The image on the focusing plate 33 is changed to an upright image by a pentaprism 34 and can be observed by a photographer through an eyepiece 35. The movable reflector 32 has a semitransparent mirror through which a light flux passes to a sub-reflector 41. The light flux which passes through the semitransparent mirror is reflected by the sub-reflector 41 which is provided obliquely behind the movable reflector 32. The light flux reflected by the sub-reflector 41 is again reflected by a reflector 42 and forms an image on a range sensor 44 through an image forming lens 43.

Figure 1A:
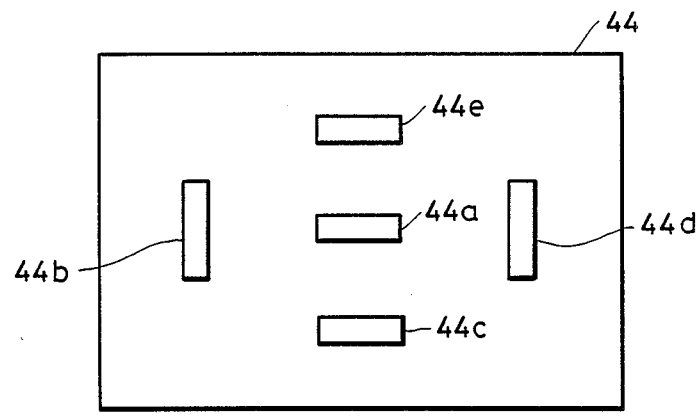
FIGS. 1(a) and 1(b) are front and plan drawings, respectively, showing the range sensor and the photometric sensor according to the preferred embodiment.

The range sensor 44 comprises five sensor elements 44a–44e for so-called multiply partitioned range finding which partitions a photograph scene into plural areas and finds the range of each area respectively. FIG. 1(a) shows an arrangement of multiply partitioned sensor elements 44a–44e of the range sensor 44. The light that passes through the center of a photography scene is received by the sensor element 44a, and the peripheral light is received by the sensor elements 44b-44e.

On the other hand, when automatically adjusting the flash of the strobe light, movable reflector 32 and sub-reflector 41 spring up and turn away from the path of the light. After that, a focal-plane shutter 36 opens to its full width, and with a synchronous contact turned on, a strobe device 38 is excited and emits light. The strobe light reflected from the object strikes upon the film 37 which undergoes exposure. Simultaneously, a part of the diffused strobe light reflected from film 37 passes through a convex lens 70 and enters the multiply partitioned photometric sensor 50. Photometric output from the photometric sensor 50 is utilized by a circuit mentioned below for calculation of exposure. At a point of time that proper exposure is obtained, a signal for stopping emission of light is outputted and automatic light adjusting ends. Then, the focal-plane shutter 36 closes, the movable reflector 32 and sub-reflector 41 return to their original positions, and the photographing operation ends. Reference numeral 40 is a film press plate which is held on a back-lid 90 by spring members 80.

Of course, the photometric sensor 50 may be used with natural light to control the shutter speed or the diaphragm to effect proper exposure control.

Figure 1B:
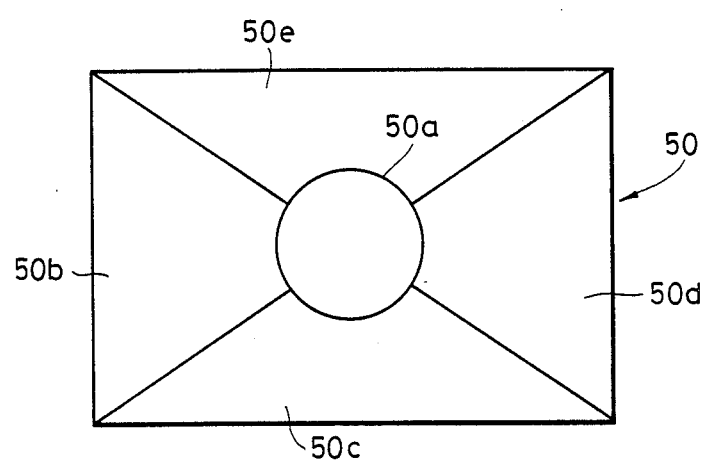

The photometric sensor 50 shown in FIG. 1(b) comprises five sensor elements 50a–50e for so-called multiply partitioned photometry which partitions a photography scene into plural areas (similar to said range sensor 44), and measures the light incident on each area. The sensor elements 50a–50e are arranged to correspond to said sensor elements 44a–44e. Further, the sensor elements 50a–50e each have a photometric area that covers (is larger than) the range finding area of a corresponding range finding element. FIG. 1(b) shows the arrangement of multiply partitioned sensor elements 50a–50e of the photometric sensor 50.

Figure 3:
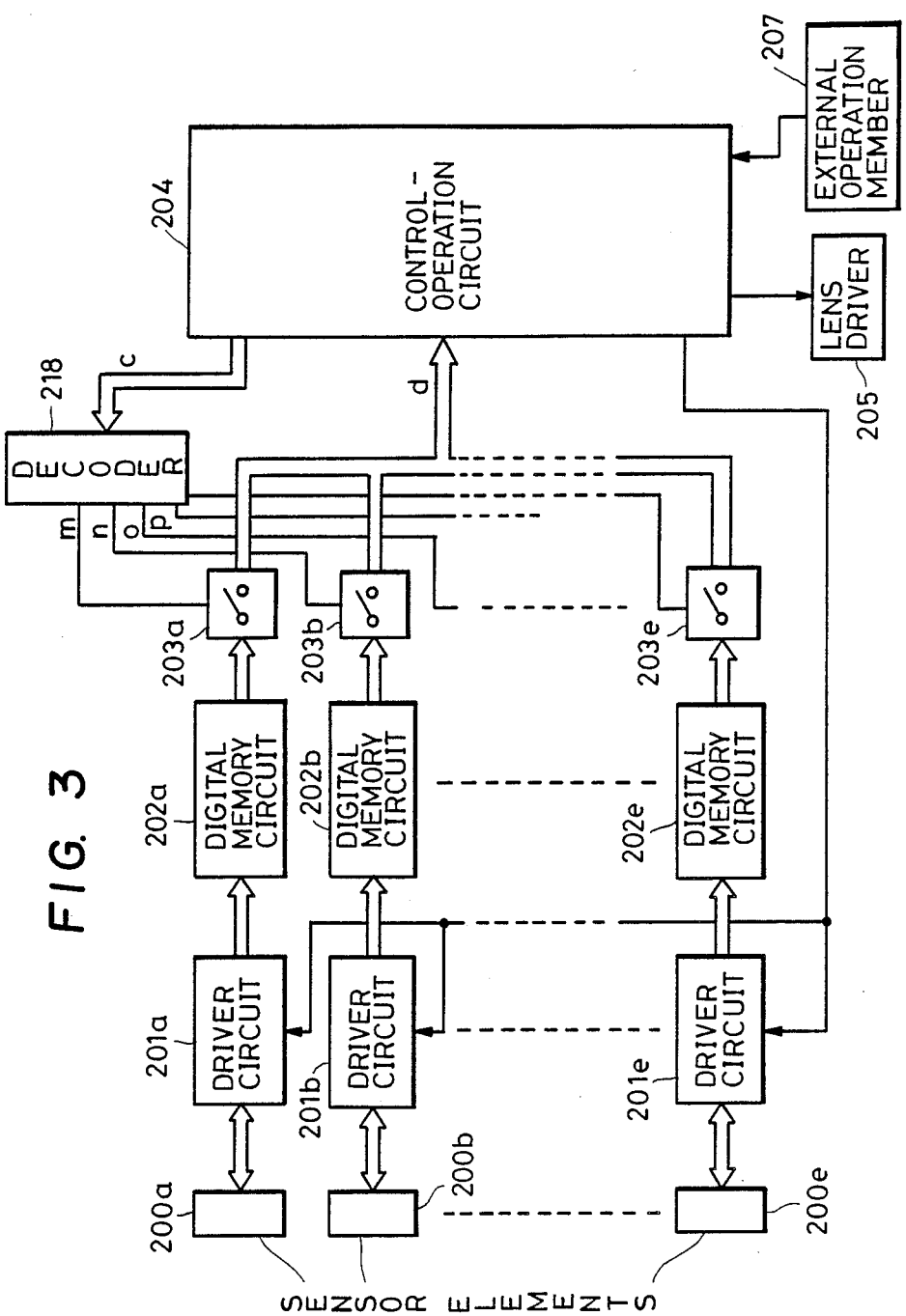
FIG. 3 is a block diagram showing an example of an input stage of a focus detecting device according to the preferred embodiment.

FIG. 3 is a block diagram showing the circuit structure of a focus detecting device according to the present invention. Reference numerals 200a, 200b, 200c, 200d, and 200e are sensor elements of a range sensor 200 and are arranged to correspond to sensor elements 44a–44e of the range sensor 44 shown in FIG. 1(a). Each range sensor element is a one-dimensional line-sensor. Reference numerals 201a, 201b, 201c, 201d, and 201e are driver circuits which drive corresponding elements of range sensor 200. The driver circuits also convert analog signals from the sensor elements into digital signals and output them to corresponding digital memory circuits 202a, 202b, 202c, 202d, and 202e. These digital memory circuits temporarily store the digital signals.

Reference numerals 203a, 203b, 203c, 203d, and 203e are gate circuits which receive signals outputted from digital memory circuits 202a-202e and are controlled by signals (which are conveyed through a line m, n, o, p or g) which were obtained by decoding (with a decoder 218) the data which was outputted from a control-operation circuit 204 through a signal line c. When the output from the decoder 218 is "H", a circuit is formed and an output from one of the digital memory circuits 202a-202e is selected to be sent out through the signal line d to the control - operation circuit 204. The control-operation circuit 204 receives selection signals from external operation member 207. External operation member 207 may comprise a dial on the camera body connected to a code plate. As the photographer adjusts the dial, the code plate contacts appropriate terminals to send a signal through control-operation circuit 204 to decoder 218.

The control - operation circuit 204 controls the focus detecting system and also processes, according to a prescribed algorithm, (for example, as disclosed in U.S. Pat. No. 4,559,446), the focus detecting signals which were detected in the range sensor 200 and stored in the digital memories. The control - operation circuit 204 also outputs a defocus amount and a defocus direction (positive or negative) according to the detected focus signals.

Then, lens driver 205 moves objective lens 31 to the proper focusing position based on the information supplied by the control-operation circuit 204.

Each one of the gate circuits 203a-203e can be selected through control-operation circuit 204 and decoder 218 by the switching operation of external operation member 207. Therefore, a photographer can perform the switching operation by manipulating the external operation member to select the sensor elements 200a-200e (sensor elements 44a-44e) of the range sensor 200 which are dispersed within a photograph scene, according to the position of the main subject within the scene.

Figure 4:
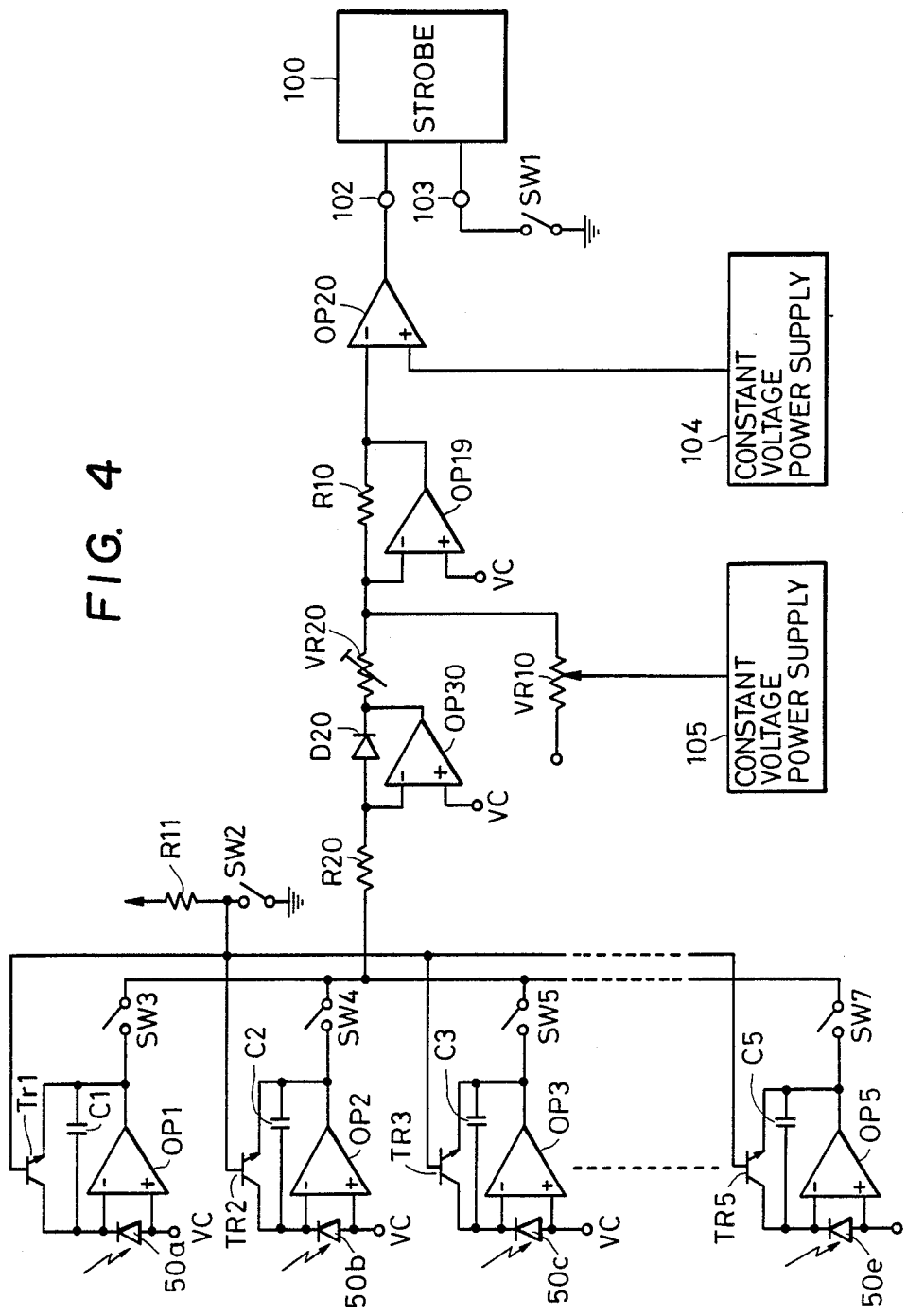
FIG. 4 is a circuit diagram showing an example of an automatic light adjusting device which controls the light quantity emitted by the strobe flash.

The circuit shown in FIG. 4 controls the emission time of the strobe flash based on the exposure measured by the photometric sensor 50.

Reference numeral 100 is a strobe circuit mounted in the strobe device 38 shown in FIG. 2, and reference numeral 102 is a contact for a signal which stops emission of the strobe flash. Reference numeral 103 is a synchronous contact, and the junction between contacts 102 and 103 is made by connecting the strobe device to a camera through a camera shoe, or the like.

Reference numerals OP1-OP5, OP19 and OP30 are operation amplifiers, OP20 is a comparator and C1-C5 are capacitors. Reference numerals TR1-TR5 are NPN transistors, R10, R11 and R20 are resistors, D20 is a diode, VR10 and VR20 are variable resistors, and 104 and 105 are constant voltage power supplies. Reference numeral SW1 is a switch which is automatically turned on when a first screen of the focal-plane shutter 36 in FIG. 2 completes its movement, and SW2 is a switch which is also controlled by movement of shutter 36 and discharges capacitors C1-C5. Reference Vc is a terminal which receives a reference voltage from a constant voltage power supply (not shown).

Assuming that the focal-plane shutter 36 is charged (closed) and the film 37 wound up, the switch SW2 is turned off, the base voltage of transistors TR1-TR5 is "H" and transistors TR1-TR5 are turned on. Therefore, both ends of capacitors C1-C5 are short-circuited and the capacitors are discharged. When the shutter release starts, a diaphragm (not shown) stops down the lens, the movable reflector 32 jumps up, an the first screen of the focal-plane shutter 36 starts to travel. When the first screen ends its travel completely, the switch SW1 is automatically turned on and controls strobe circuit 100 through the contact 103 to make the strobe emit light. Simultaneously, the switch SW2 is automatically turned on, transistors TR1-TR5 are turned off, and the capacitors C1-C5 are in the state of being chargeable. The strobe light is reflected by the main subject and the film 37 is exposed to the light through the objective lens 31. However, a part of the diffused reflected light reaches each sensor element 50a-50e of the photometric sensor 50.

Further, reference numerals SW3-SW7 are switches which are turned on and off in conjunction with the above-mentioned switching operation of the external operation member 207, and by that member at least, one of switches SW3-SW7 is selected. In other embodiments, external operation member 207 may select more than one of the switches SW3-SW7. The following is an explanation assuming that the switch SW 3 was selected by the external operation member.

Each sensor element 50a-50e of the photometric sensor 50 receives the light of the strobe flash reflected by the film 37 and starts to integrate it. While each operation amplifier OP1-OP5 outputs its integral value, only the output from the operation amplifier OP1 is inputted into a logarithmic compression circuit comprising the resistor R20, diode D20, and operation amplifier OP30, because only the switch SW 3 is turned on. Therefore the comparator OP20 compares the quantity of light from the sensor element 50a with the reference voltage from constant voltage power supply 104. When the surface area of the film 37 which corresponds to the sensor element 50a reaches the proper exposure level, comparator OP 20 gives a "H" signal which controls the strobe circuit 100 through the contact 102, and stops emission of the strobe flash.

Thus, part of the main subject on the surface of the film 37 can be properly exposed. According to the embodiment, each sensor element of the multiply partitioned range sensor 44 and each sensor element of the photometric sensor 50 are correspondingly arranged with respect to each other. In addition, the photometric area of each photometric sensor element has an area which covers the range finding area of the corresponding range sensor element. Therefore, even if the main subject is positioned outside the center of a photograph scene, focusing can be properly adjusted and the strobe flash can be controlled so that the main subject is properly exposed. Consequently, accurate and sharp photographs can be produced.

In the above embodiment, control-operation circuit 204, decoder 218, and the external operation member 207 correspond to the means for selecting a range finding element, and switches SW3-SW7 and the external operation member 207 correspond to the means for selecting a photometric element.

As explained above, according to the invention the photometric sensor 50 has an area such that the photometric area of each photometric element covers the range finding area of the corresponding range finding element of the range sensor 44. Therefore, the range finding position within a photograph scene corresponds to the photometric position for the strobe light even when the scene changes position to some degree. In consequence it is possible to take a photograph by strobe flash at all times at the exposure level which is proper for the main subject.

The specific structural details of the devices represented by blocks in the drawings are per se well known or could be readily constructed by the person of ordinary skill in this field without undue experimentation. Therefore, the exact structure of the blocks in the drawings is not described in further detail in order to more clearly describe the present invention, and since such details are not critical to the best mode of carrying out the present invention.

While the present invention has been described with respect to what is presently considered to be the preferred embodiment, it is to be understood that the invention is not limited to the disclosed embodiments. To the contrary, the present invention is intended to cover various modifications and equivalent arrangements included within the spirit and scope of the appended claims. The scope of the following claims is to be accorded the broadest intepretation so as to encompass all such modifications and equivalent structures and functions.

What is claimed is:

1. Photography apparatus comprising:
    range sensor means for sensing a range to an object, said range sensor means having a plurality of range sensing elements; and
    photometric sensor means, different from said range sensor means, for sensing photometric values of the object, said photometric sensor means having a plurality of photometric sensing elements, positions of said photometric sensing elements on said photometric sensor means corresponding to positions of said range sensing elements on said range sensing means, each photometric sensing element having an area which is larger than an area of the corresponding range sensing element.

2. Apparatus according to claim 1 further comprising selecting means for selecting one of said range sensing elements and its corresponding photometric sensing element.

3. Apparatus according to claim 2 further comprising:
    an objective lens;
    driving means for driving said objective lens; and
    processing means for causing said driving means to drive said objective lens to focus on the object in accordance with an output signal from the range sensing element selected by said selecting means.

4. Apparatus according to claim 3 wherein said processing means includes:
    a plurality of driver circuits respectively coupled to said plurality of range sensing elements;
    memory means for storing output signals from said plurality of driver circuits;
    switch means for selecting one of the driver circuit output signals stored in said memory means; and
    control means for causing said switch means to select said one driver circuit output signal.

5. Apparatus according to claim 2 further comprising:
    a plurality of amplifiers respectively coupled to said plurality of photometric sensing elements, for amplifying signals output by said photometric sensing elements;
    switching means for selecting an output signal from one of said plurality of amplifiers; and
    control means for providing an output signal when the output signal selected by said switching means reaches a predetermined level.

6. Apparatus according to claim 5 further comprising:
    a light source for generating light which is reflected by the object and received by said photometric sensor means;
    wherein said control means provides its output signal to said light source to cause said light source to stop generating light.

7. Photography apparatus comprising:
    range sensor means, having a plurality of range sensing elements, for sensing a range to an object;
    photometric sensor means different from said sensor means and having a plurality of photometric elements, for sensing a light exposure for light reflected from the object, said photometric elements being disposed on said photometric sensor means at positions corresponding to positions at which said range sensing elements are disposed on said range sensor means, each photometric element having an area which is larger than an area of the corresponding range sensing element; and
    selecting means for selecting one of said range sensing elements and its corresponding photometric element.

8. Apparatus according to claim 7 further comprising:
    a camera body supporting said range sensor means, said photometric sensor means, and said selecting means;
    an objective lens coupled to said camera body;
    driving means for driving said objective lens; and
    processing means for causing said driving means to drive said objective lens to focus on the object in accordance with an output signal from the range sensing element selected by said selecting means.

9. Apparatus according to claim 8 wherein said processing means includes:
    a plurality of driver circuits respectively coupled to said plurality of range sensing elements;
    memory means for storing output signals from said plurality of driver circuits;
    switch means for selecting one of the driver circuit output signals stored in said memory means; and
    control means for causing said switch means to select said one driver circuit output signal.

10. Apparatus according to claim 9 further comprising:
    a plurality of amplifiers respectively coupled to said plurality of photometric elements, for amplifying signals output by said photometric elements;
    switching means for selecting an output signal from one of said plurality of amplifiers; and
    controlling means for providing an output signal when the output signal selected by said switching means reaches a predetermined level.

11. Apparatus according to claim 10 further comprising:
    a light source for generating light which is reflected by the object and received by said photometric sensor means;

wherein said controlling means provides its output signal to said light source to cause said light source to stop generating light.

12. Apparatus according to claim 11 further comprising an external operation member, coupled to said selecting means, for (1) causing said switching means to select the output signal from said one amplifier, and (2) causing said switch means to select the driver circuit output signal of the range sensing element corresponding to said one amplifier.

13. Apparatus according to claim 7 wherein said range sensor means comprises five range sensing elements, and wherein said photometric sensor means comprises five photometric elements.

14. A camera comprising:
an objective lens;
a movable reflector for reflecting light passing through said objective lens;
range sensor means, having a plurality of range sensing areas, for receiving the light reflected from said movable reflector means;
a film holder adapted to hold a film; and
photometric sensor means, having a plurality of photometric sensing areas, for receiving light which has passed through said objective lens, bypassed said movable reflector when said reflector is moved, and been reflected from the film held by said film holder, said photometric sensing areas being arranged on said photometric sensor means in positions corresponding to positions that said range sensing areas are disposed on said range sensor means, to cause a light beam which is incident on one photometric sensing area to be incident on the corresponding range sensing area, each photometric sensing area having a greater surface area than a surface area of the corresponding range sensing area.

15. A camera according to claim 14 further comprising selecting means for selecting one of said range sensing areas and its corresponding photometric sensing area.

16. A camera according to claim 15 further comprising processing means for providing a focus signal based on an output signal from the selected range sensing area, and an exposure signal based on an output signal of the selected photometric sensing area.

17. A camera according to claim 16 further comprising a light source for generating light, and wherein the exposure signal causes said light source to stop generating light.

* * * * *